(12) United States Patent
Miandji et al.

(10) Patent No.: US 12,174,922 B2
(45) Date of Patent: Dec. 24, 2024

(54) METHOD, COMPUTER PROGRAM, COMPUTER PROGRAM PRODUCT AND SYSTEM FOR REPRESENTING VISUAL INFORMATION

(71) Applicant: Sparsit AB, Helsingborg (SE)

(72) Inventors: Ehsan Miandji, Rennes (FR); Jonas Unger, Norrkoeping (SE); Per Larsson, Helsingborg (SE)

(73) Assignee: SPARSIT AB, Helsingborg (SE)

( * ) Notice: Subject to any disclaimer, the term of this patent is extended or adjusted under 35 U.S.C. 154(b) by 843 days.

(21) Appl. No.: 17/413,321

(22) PCT Filed: Dec. 11, 2019

(86) PCT No.: PCT/SE2019/051266
§ 371 (c)(1),
(2) Date: Jun. 11, 2021

(87) PCT Pub. No.: WO2020/122800
PCT Pub. Date: Jun. 18, 2020

(65) Prior Publication Data
US 2022/0067431 A1    Mar. 3, 2022

(30) Foreign Application Priority Data

Dec. 13, 2018 (SE) .................................. 1851573-4

(51) Int. Cl.
*G06T 3/00* (2024.01)
*G06F 18/211* (2023.01)
(Continued)

(52) U.S. Cl.
CPC ............ *G06F 18/28* (2023.01); *G06F 18/211* (2023.01); *G06F 18/23* (2023.01); *G06N 20/20* (2019.01);
(Continued)

(58) Field of Classification Search
CPC ........ G06Q 30/08; G06Q 40/025; G02B 7/38; G02B 27/0172; H04N 5/3696;
(Continued)

(56) References Cited

U.S. PATENT DOCUMENTS

| 8,396,310 | B1 | 3/2013 | Kadambe et al. |
| 10,268,931 | B2 * | 4/2019 | Shafer .................... G06V 20/52 |

(Continued)

FOREIGN PATENT DOCUMENTS

| CN | 105844635 A | 8/2016 |
| CN | 107170020 A | 9/2017 |

OTHER PUBLICATIONS

Chinese Office Action for Chinese Patent Application No. 2019800828060, dated Sep. 27, 2023, 15 pages, Chinese National Intellectual Property Administration, Beijing, China.

(Continued)

*Primary Examiner* — Phuoc H Doan
(74) *Attorney, Agent, or Firm* — Alston & Bird LLP (57) ABSTRACT

The present disclosure relates to a computer implemented method for representing a data set comprising at least one n dimensional data element representing visual information, said method comprising obtaining (210) said data set, obtaining (220) a dictionary ensemble comprising a plurality of dictionaries each comprising at least one basis function (102), assigning (230) each at least one data element to a dictionary, wherein a set of basis functions represents an m dimensional transformation domain, transforming (240) the at least one data element with the corresponding dictionary of basis functions to the transformation domain wherein each data element is defined by an associated coefficient set, sparsifying (250) the coefficient sets, forming (260) the representation of the visual information comprising a coefficient data set and the corresponding dictionaries.

25 Claims, 4 Drawing Sheets

(51) Int. Cl.
    *G06F 18/23*     (2023.01)
    *G06F 18/28*     (2023.01)
    *G06N 20/20*     (2019.01)
    *G06T 5/60*     (2024.01)

(52) U.S. Cl.
    CPC ...... *G06T 5/60* (2024.01); *G06T 2207/10052* (2013.01); *G06T 2207/20081* (2013.01)

(58) Field of Classification Search
    CPC .... G06K 9/6255; G06K 9/6218; G06N 20/20; G06F 3/011; G06F 19/327; G02C 7/04; G09G 3/32; H04W 88/02
    See application file for complete search history.

(56) References Cited

U.S. PATENT DOCUMENTS

| | | | |
|---|---|---|---|
| 2012/0099774 A1* | 4/2012 | Akcakaya | G06T 11/008 382/131 |
| 2016/0012334 A1 | 1/2016 | Ning et al. | |
| 2016/0162577 A1 | 6/2016 | Mansour et al. | |
| 2016/0283858 A1 | 9/2016 | Lin et al. | |
| 2017/0213109 A1 | 7/2017 | Moody et al. | |
| 2018/0005086 A1 | 1/2018 | Jain et al. | |

OTHER PUBLICATIONS

Aharon, Michal, Et A., "K-SVD: An Algorithm for Designing Overcomplete Dictionaries for Sparse Representation", IEEE Transactions on Signal Processing, Nov. 2006, pp. 4311-4322, vol. 54, No. 11, IEEE, US.

Ben-Haim, Zvika, et al., "Coherence-Based Performance Guarantees for Estimating a Sparse Vector Under Random Noise", arxiv. org, Dec. 2, 2009, 12 pages, Cornell University Library, US.

Candes, Emmanuel, et al., "An Introduction to Compressive Sampling", IEEE Signal Processing Magazine, Mar. 2008, pp. 21-30, vol. 25, No. 2, retrieved from the Internet at <https://authors.library.caltech.edu/10092/1/CANieeespm08.pdf> on May 27, 2021.

Candes, Emmanuel, et al., "Stable Signal Recovery from Incomplete and Inaccurate Measurements", arxiv.org, Feb. 2005, 15 pages, Cornell University Library, US.

Gurumoorthy, Karthik S., et al., "A Method for Compact Image Representation Using Sparse Matrix and Tensor Projections onto Exemplar Orthonormal Bases", IEEE Transactions on Image Processing, Feb. 2010, 16 pages, retrieved from the Internet at https://www.cise.ufl.edu/~anand/pdf/TIP_Image_Compression_webfinal.pdf on May 27, 2021.

International Searching Authority, International Search Report and Written Opinion received for International Application No. PCT/SE2019/051266, dated Mar. 9, 2020, 17 pages, European Patent Office, Netherlands.

Miandji, Ehsan, et al., "A Unified Framework for Compression and Compressed Sensing of Light Fields and Light Field Videos", ACM Transactions on Graphics, Jun. 2019, pp. 1:1-1:18, vol. 1, No. 1, Association for Computing Machinery, US.

Miandji, Ehsan, et al., "Compressive Image Reconstruction in Reduced Union of Subspaces", Computer Graphics Forum, Computer Science, Jun. 22, 2015, 13 pages, retrieved from the Internet at <http://liu.diva-portal.org/smash/get/diva2:825377/FULLTEXT02> on May 27, 2021.

Rubinstein, Ron, et al., "Dictionaries for Sparse Representation Modeling", Proceeding of the IEEE, Jun. 2010, 12 pages, vol. 98, No. 6, retrieved from the Internet at <https://www.researchgate.net/publication/224133031_Dictionaries_for_Sparse_Representation_Modeling/link/00b4952246f2372f8e000000/download> on May 27, 2021.

Swedish Patent and Registration Office, Search Report received for Application No. 1851573-4, dated May 23, 2019, 2 pages, Sweden.

Tosic, Ivana, et al., "Dictionary Learning", IEEE Signal Processing Magazine, Mar. 2011, pp. 28-38, vol. 28, No. 2, retrieved from the Internet at <http://scholar.google.com/scholar_url?url=https://infoscience.epfl.ch/record/161378/files/spm2011.pdf&hl=en&sa=X&ei=-_2vYMqLMMiMy9YP0oia4A8&scisig=AAGBfm3OztL9x-WEIelhSXyeqhsF-EwNDg&nossl=1&oi=scholarr> on May 27, 2021.

* cited by examiner

METHOD, COMPUTER PROGRAM, COMPUTER PROGRAM PRODUCT AND SYSTEM FOR REPRESENTING VISUAL INFORMATION

CROSS REFERENCE TO RELATED APPLICATIONS

This application is a National Stage Application, filed under 35 U.S.C. § 371, of International Application No. PCT/SE2019/051266, filed Dec. 11, 2019, which claims priority to Sweden Application No. 1851573-4, filed Dec. 13, 2018; the contents of both of which as are hereby incorporated by reference in their entireties.

BACKGROUND

Related Field

The present disclosure relates to representing visual information, such as light field data.

Description of Related Art

Over the last decade, a field of computational photography, especially light field and multi-view imaging, has emerged and matured as a new paradigm in imaging and video technology. These technologies enable a range of novel applications ranging from advanced multi-dimensional image processing to cinematic editing, glasses free 3D display systems, single sensor light field cameras, spectral imaging and appearance capturing. A challenge of using these new formats of visual information is related to the size of the produced data. Two significant issues arising due to large data sizes are the efficient storage of data and the infrastructure required to transfer the captured data from the sensor systems. Data compression and image compression are two well-established field of research dedicated to addressing challenges with handling and storing large data sizes.

BRIEF SUMMARY

A highly important and still unsolved challenge inherent to capture, storage and processing of high-dimensional data is to handle the very large data sizes.

The invention relates to a solution to this problem.

The invention relates to computer implemented method for representing a data set comprising n dimensional data elements representing visual information, comprising a step of obtaining visual information, a step of obtaining an ensemble of dictionaries comprising sets of basis functions, a step of assigning data elements to dictionaries, a step of transforming the data elements with the corresponding sets of basis functions into a transformation domain represented by sets of coefficients, a step of sparsifying said sets of coefficients and a step of forming the representation of the visual information based on the sparsified coefficient sets and the corresponding dictionaries of basis functions. The step of forming the representation of the visual information may comprise compressing the sparsified coefficient sets.

One advantage with the method as defined above is that the compression rate of visual information may be improved.

One advantage with the method as defined above is that the reconstruction error of compressed visual information may be decreased.

One advantage with the method as defined above is improved compressed sensing of visual information.

The invention as defined herein enables improved selective reconstruction of compressed visual information.

The step of obtaining a data set comprising data elements of visual information may comprise obtaining multi-dimensional visual information. A data element comprises at least one data point. The visual information may comprise data elements and/or data points based on sensor data and possibly interpolation of sensor data. The visual information may comprise data elements and/or data points based on computer generated imagery and possibly interpolation of computer generated imagery.

The method may be of particular use in the capture, storage and processing of very large data sets, such as high-dimensional data like view angle data. The method may be used to compress any kind of multidimensional data. The method may use non-local clustering. The method may be used for non-local clustering for multi-dimensional data sets. The method allows for efficient local reconstruction of compressed possibly multidimensional data.

The step of obtaining an ensemble of dictionaries comprising basis functions may comprise learning an ensemble of dictionaries. The ensemble of dictionaries comprises sets of basis functions representing the n dimensional data elements of visual information in an m dimensional transformation domain. The dimensionality of the transformation domain, m, may be equal to or larger than 2. The dimensionality of the transformation domain, m, may be equal to or larger than the dimensionality of the visual information, n. The present disclosure relates to a method for transformation to and from arbitrary dimensionalities. A set of basis functions may independently represent the visual information in its various dimensions in the transformation domain. Transformation of data elements of visual information to a multidimensional transformation domain may allow specific data elements to be reconstructed, such as reconstructing an individual frame of a video as opposed to reconstructing the whole video. The visual information comprising n dimensional data elements representing visual information may each be assigned a dictionary. The data elements may be assigned based on sparsity. Assigning data elements based on sparsity allows all data elements within a certain range of sparsity to be transformed with a dictionary comprising a set of basis functions suitable for transforming data elements within that range of sparsity to a transformation domain, wherein the data element is represented by an associated coefficient set.

The term transformation domain as used herein relates to the representation of visual information by sets of coefficients and corresponding sets of basis functions. A well-known transformation is achieved by the Fourier transform, with the basis function $e^{-2\pi i \omega x}$, which converts a time function into a sum of sine waves of different frequencies, each of which represents a frequency component. The frequency components in the frequency-domain represent the time function. Similarly, in the present disclosure the sets of coefficients represent the visual information in the transformation domain defined by the basis functions of each dictionary.

The term visual information refers to both sensor data and computer generated imagery.

The term "data element" as used herein relates to a patch of the visual information comprising at least one data point. A patch of an image is also called an "image block" or a "window". A patch may be a small piece of an image, such as a 10×10 pixel area.

The term "data point" as used herein relates to the smallest unit of data, such as the red, green or blue value of a pixel.

The term coefficient set comprises a set of values that if inserted into the set of basis functions describes a patch of the visual information.

At least part of the obtained ensemble of dictionaries may be created as part of the step of obtaining an ensemble of dictionaries and/or created beforehand by a training process utilizing pre-clustered training visual information of the same dimensionality, n, as the visual information. The training process aims to create dictionaries forming as sparse coefficient sets as possible for the pre-clusters of training visual information. The training visual information may be of the same type as the visual information, such as both being either live action video or animated video. The training process of creating the ensemble of dictionaries may be a machine-learning assisted process. An existing ensemble may be expended and/or reduced. The process of creating the ensemble may be a process of expanding an existing ensemble of dictionaries with additional dictionaries. The process of creating the ensemble may be a process of limiting an existing ensemble of dictionaries by removing existing dictionaries. The dictionary ensemble trained on a certain type of visual information is expected to show a high degree of sparsity in the coefficient sets representing similar visual information in the transformation domain. The creation of sparse coefficient sets and sparsification of said sets are important factors for efficient compression and sampling. The dictionary ensemble will normally comprise a multitude of basis functions but have a very low memory footprint compared to the data set size, hence encoding and decoding efficiency may be substantially improved.

When it comes to the step of assigning each data element to a dictionary, the data elements may be assigned to dictionaries based on sparsity. The method comprises a step of transforming each data element to the transformation domain, wherein each data element is represented by one dictionary of basis functions and a set of coefficients. The coefficient sets, representing the data elements in the transformation domain defined by the set of basis functions of the corresponding dictionary, comprises coefficient values. Coefficient values close to zero, under a certain absolute value, may have a negligible impact on the data point values of the corresponding reconstructed data element. The basis function sets from ensemble of dictionaries learned by training visual information comprising data elements of visual information of a similar type and sparsity as the data elements to be transformed are expected to generate coefficient sets with a significant number of coefficients values close to zero. The present disclosure utilizes the fact that visual information is characteristically only locally sparse.

The method comprises a sparsification step, wherein coefficient values close to zero are set to zero. The threshold below which the absolute value of coefficient values are truncated to zero may be based on a predetermined value determined during the creation of the ensemble of dictionaries. The threshold below which the absolute value of coefficient values are truncated may be based on at least one normalized absolute value of the coefficient value's contribution to data points in the data element. After the truncating step each coefficient set is expected to contain a significant number of zero values, the coefficient set is said to be sparsified. The more coefficients that are sparsified to zero the smaller the size of the compressed coefficient set is expected to be. The more coefficients that are sparsified to zero more information of the visual information is lost and a larger reconstruction error is to be expected. Due to the inverse correlation between small size and loss of information the sparsification step may be adjusted based on the type of visual information being sparsified.

The step of forming the representation of the visual information may comprise compression of at least one coefficient set. The compression of the at least one coefficient set may comprise use of a compression algorithm.

The method may comprise a reconstruction step comprising selecting a data element and selecting at least one dimension for reconstruction of data points in said data element, and reconstructing at least one data point in the selected at least one dimension from the corresponding set of coefficients and dictionary of basis functions. Reconstruction of an individual frame of a 2D video data set may require reconstruction of a multitude of data points from a multitude of data elements, however, reconstructing the complete data set may require a significantly larger number of computations. The method may be arranged to transform a data set comprising key frames and reconstruct a data set comprising intermediate frames. Intermediate frames are frames between known key frames, such as the extra frames generated if a 20 fps video of key frames was transformed and reconstructed into a 60 fps video.

A reconstruction error of the method may be calculated by reconstructing at least part of a data element and comparing the reconstructed at least part of a data element with the corresponding original data element. For calculating reconstruction errors all data points of a data element may be reconstructed for comparison.

The present disclosure further relates to a computer program for representing a data set comprising n dimensional data elements representing visual information. The computer program comprises routines for performing the method according to the present disclosure. In one example, the computer program is an application on a sensor system.

The present disclosure further relates to a computer program product. The computer program product comprises a program code stored on a readable data storage medium for representing a data set comprising n dimensional data elements representing visual information. The data storage medium may be non-volatile. The program code is configured to execute the method according to the present disclosure. The computer program product may control a sensor system. Said computer program product may be an application for a sensor system.

The present disclosure further relates to a system for representing a data set comprising n dimensional data elements representing visual information, comprising a processor, a memory storage comprising a computer program product, at least one visual information generating device, wherein the processor is arranged to store data on the memory storage, control the at least one visual information generating device, receive visual information from at least one visual information generating device, run the computer program product arranged to execute the steps as discussed above, and provide the representation of the visual information based on the sparsified coefficient sets. The system may be a personal computer. The system may comprise a sensor system. The system may be a sensor system. The system may be a compressive sensor system, arranged to provide a significantly compressed representation of the captured visual information. The system may be a compressive light field camera. The processor may be arranged to control at least one visual information generating device. At least one visual information generating device may be a camera. At least one visual information device may be a database comprising visual information. The system may comprise hardware for wireless communication between the processor and at least one of the at least one visual information generating device.

DETAILED DESCRIPTION OF VARIOUS EMBODIMENTS

Throughout the figures, same reference numerals refer to same parts, concepts, and/or elements. Consequently, what will be said regarding a reference numeral in one figure applies equally well to the same reference numeral in other figures unless not explicitly stated otherwise.

Figure 1:
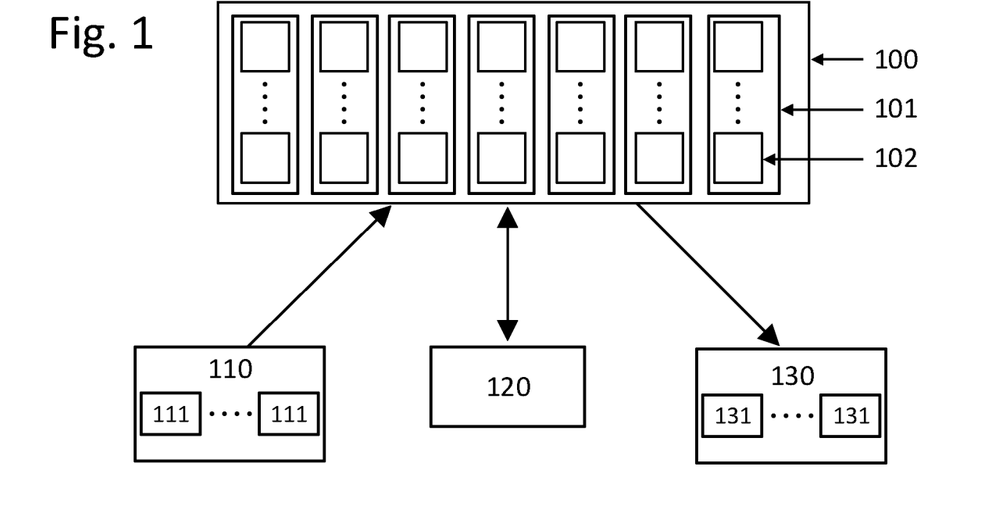
FIG. 1 illustrates an example of an ensemble of dictionaries comprising basis functions.

FIG. 1 illustrates an example of an ensemble 100 of dictionaries comprising basis functions 102.

The ensemble 100 comprises at least one dictionary 101. The ensemble 100 may comprise a multitude of dictionaries. Each dictionary 101 comprises at least one basis function 102. Each dictionary 101 may comprise a multitude of basis functions 102, forming a multi-dimensional dictionary ensemble 100.

The visual information comprises at least one data element 110, which comprises at least one data point 111. A data element 110 of dimensionality n may be transformed by its assigned dictionary 101 of basis functions 102 to form a set of sparse coefficients 120 representing the data element 110 in the transformation domain. The sparse coefficients 120 may be saved to a memory storage, such as a database or a solid state drive. A set of sparse coefficients 120 and the corresponding dictionary 101 may be used to form a reconstructed data element 130. When reconstructing, all data points 131 of the data element 130 need not be reconstructed. At least one data point 131 of the data element 130 along at least one dimension may be selected for reconstruction. By comparing a data element 110 or at least one data point 111 with the corresponding reconstructed data element 130 or at least one reconstructed data point 131 a reconstruction error may be calculated.

The ensemble 100 of dictionaries may be created by training the ensembles of dictionaries on training visual information of a similar type as the visual information to be compressed, such as live action 2D video or animated 2D video. The training visual information may comprise at least parts of the visual information to be compressed. The ensemble 100 of dictionaries may be trained by dividing the training visual information into pre-clusters based on sparsity and learning a pre-cluster ensemble of dictionaries for each pre-cluster. The obtained pre-cluster ensemble of dictionaries is learned so that the pre-cluster ensemble of dictionaries represents the pre-cluster of training visual information in the transformation domain with sparse sets of coefficients. The learned pre-cluster ensembles of dictionaries may be combined to form an ensemble of dictionaries 100.

Figure 2:
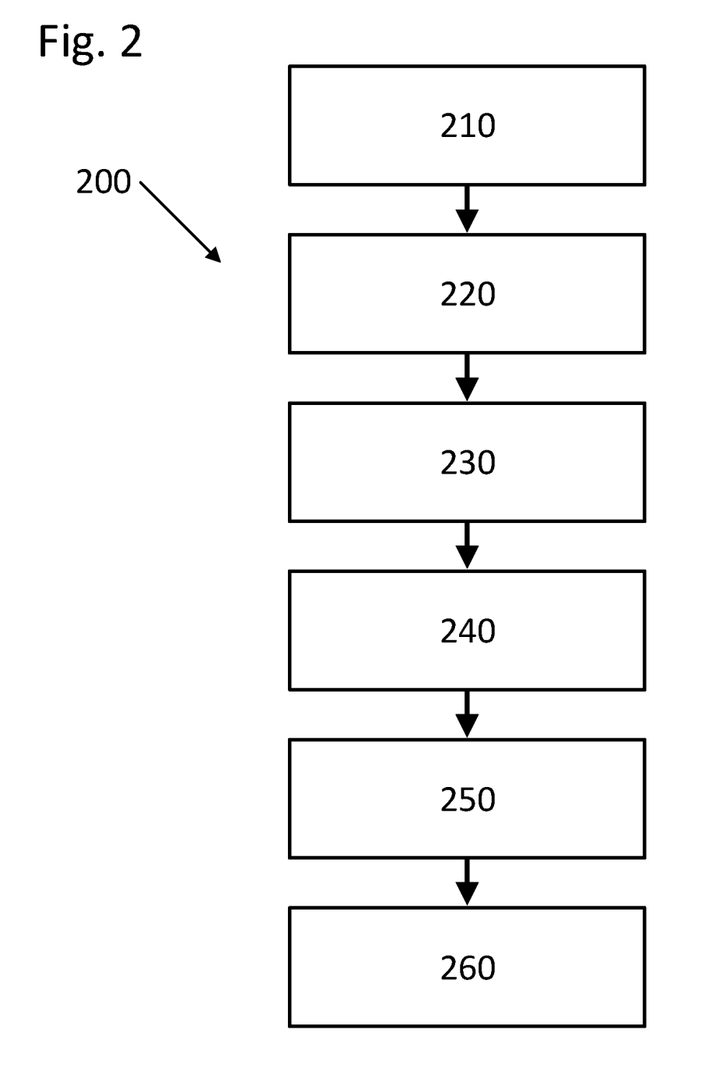
FIG. 2 illustrates an example of a method for representing visual information.

FIG. 2 illustrates an example of a method 200 for representing visual information.

The method 200 comprises a step 210 of obtaining visual information comprising at least one data element 110. The visual information may be multi-dimensional. The visual information may comprise computer generated imagery. The visual information may be obtained from a non-volatile storage medium. The visual information may be obtained continuously from a sensor system. The visual information may be obtained from at least one camera capturing a physical scene. The visual information may be data elements 110 and/or data points 111 based on interpolation of sensor data. The visual information may be data elements 110 and/or data points 111 based on interpolation of computer generated imagery.

The method comprises a step 220 of obtaining an ensemble 100 of dictionaries comprising at least one set of basis functions 102. The ensemble 100 of dictionaries comprises sets of basis functions 102 arranged to transform data elements 110 of visual information to the transformation domain. The sets of basis functions 102 may transform the visual information into a transformation domain of equal or higher dimensionality. The dimensionality of the transformation domain, m, may be equal to or larger than 2. A set of basis functions 102 and the corresponding sets of coefficients 120 may independently represent the visual information in its various dimensions in the transformation domain. The step 220 of obtaining an ensemble 100 of dictionaries may comprise creating and/or training and/or learning and/or modifying an ensemble of dictionaries 100.

The method comprises a step 230 of assigning each data element 111 to a dictionary 101. The step 230 of assigning each data element 111 to a dictionary may assign data elements 111 to fewer dictionaries 101 than there are dictionaries 101 in the ensemble 100. The assignment of data elements 111 to dictionaries 101 may be based on sparsity. The assignment of data elements 111 to dictionaries 101 may comprise machine learning.

The method comprises a step 240 of transforming the data elements 111 of the visual information into the transformation domain, wherein each coefficient set 120 and corresponding set of basis functions 102 describes a data element 111 of the visual information. For an ensemble 100 of dictionaries created based on training visual information of a similar type and sparsity as the visual information to be transformed by the basis function sets 102 are expected to generate coefficient sets 120 with a significant number of coefficients 120 with values close to zero.

The method comprises a step 250 of sparsifying the coefficient sets 120. The sparsifying step 250 of the coefficient sets is an irreversible step as information is permanently lost. The step 250 of sparsifying may allow for an increased potential to compress the coefficient sets. A correlation is to be expected between the level of sparsification, the reconstruction error and the potential data compression ratio, however, a small reconstruction error and a large data compression ratio is desired. The step 250 of sparsifying the coefficient sets 120 may comprise setting the value of coefficients 120 close to zero to zero. The step 250 of sparsifying the coefficient sets 120 may comprise setting the value of coefficients 120 with a low relative contribution to the data element of visual information to zero. The thresholds for setting the value of coefficients 120 close to zero to zero may be defined by the amount of tolerable error.

The method comprises a step 260 of forming the representation of the visual information comprising a coefficient data set and the corresponding dictionaries. The coefficient data set may comprise at least one coefficient set. The step 260 of forming the representation of the visual information may comprise compression of at least one coefficient set. The compression of the at least one coefficient set may comprise a compression algorithm suitable for compressing sparse data.

Figure 3:
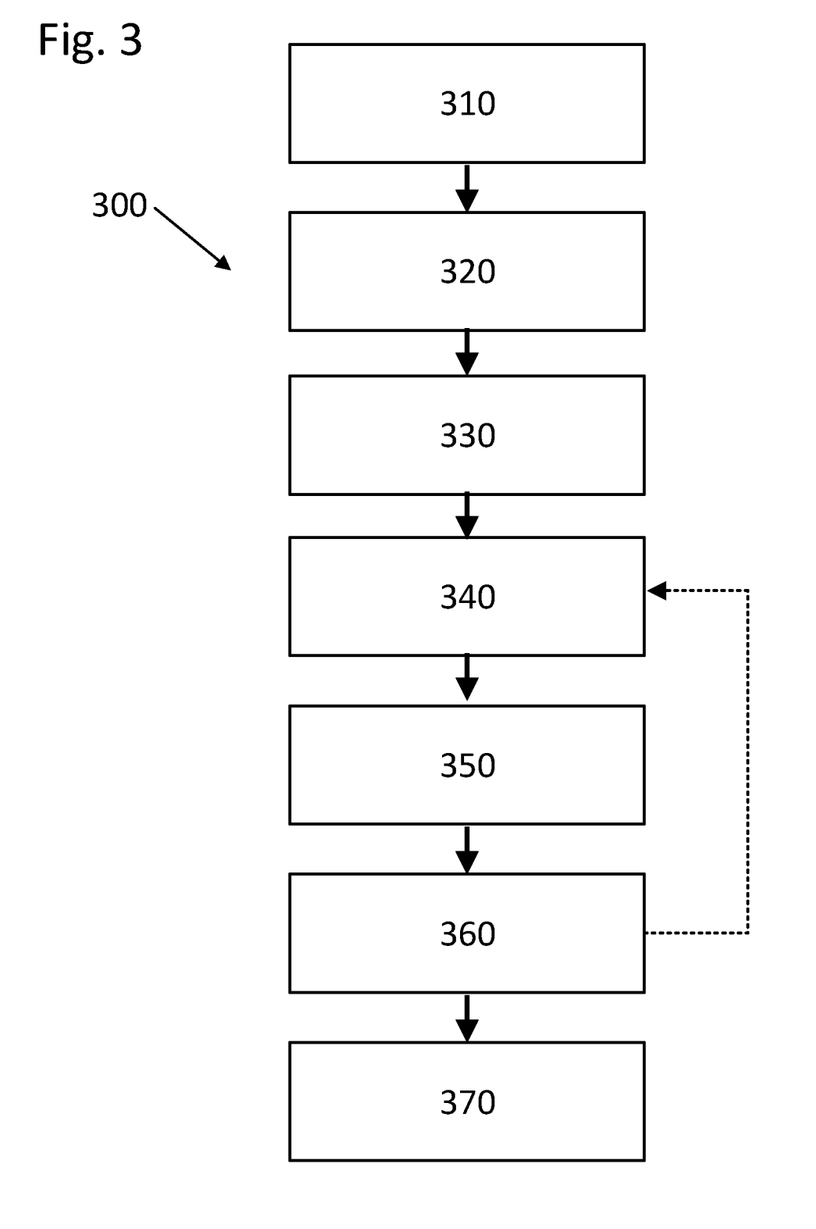
FIG. 3 illustrates an example of a method for learning an ensemble of dictionaries.

FIG. 3 illustrates an example of a method 300 for learning an ensemble 100 of dictionaries. The step 220 of obtaining an ensemble 100 of dictionaries in the method 200 for representing visual information may comprise the method 300 for learning an ensemble of dictionaries or steps thereof.

The method 300 for learning an ensemble 100 of dictionaries comprises a step 310 of obtaining a training data set comprising training data elements representing training visual information, a step 320 of pre-clustering the training visual information into at least one pre-cluster, a step 330 of initiating a pre-cluster ensemble of dictionaries for each pre-cluster, a step 340 of clustering the at least one pre-cluster by assigning each training data element to a dictionary in the corresponding pre-cluster ensemble, a step 350 of training the at least one pre-cluster ensembles to minimize reconstruction error and maximize sparsity of coefficients for the corresponding training data elements, a step 360 of updating the clustering and iterating the step 350 of training until at least one set of criteria is reached, and a step 370 of combining at least one of the at least one pre-cluster ensemble to form an ensemble of dictionaries 100.

The method 300 for learning an ensemble 100 of dictionaries may be a machine learning assisted process. The step 310 of obtaining a training data set may comprise a training data set of the same dimensionality and type as the data elements 111 of visual information to be represented in a later stage by learned ensemble 100 of dictionaries. The step 320 of pre-clustering the training visual information may be based on sparsity. The step 320 of pre-clustering the training visual information may comprise machine learning. The step 330 of initiating a pre-cluster ensemble of dictionaries for each pre-cluster may comprise initiating pre-cluster ensembles based on the sparsity of the corresponding pre-cluster. The step 340 of clustering the at least one pre-cluster by assigning each training data element to a dictionary may be based on sparsity. The step 340 of clustering the at least one pre-cluster by assigning each training data element to a dictionary may comprise machine learning. The step 350 of training the at least one pre-cluster ensembles may be arranged to minimize the computational requirements for encoding and decoding. The step 360 of updating the clustering and iterating the step 350 of training may be arranged to minimize the number of dictionaries with training data elements assigned. The step 370 of combining at least the at least one pre-cluster ensemble to form an ensemble of dictionaries 100 may comprise combining the at least one pre-cluster ensemble and at least one dictionary from at least one other ensemble 100 of dictionaries.

Figure 4:
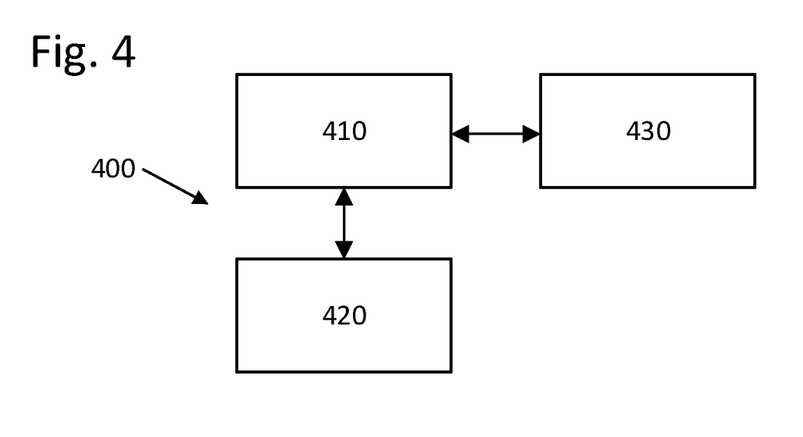
FIG. 4 illustrates an example of a system for representing visual information.

FIG. 4 illustrates an example of a system 400 for representing visual information. The system 400 for representing a data set comprising n dimensional data elements 110 representing visual information comprising a processor 410, a memory storage 420 comprising a computer program product, at least one visual information generating device 430, wherein the processor 410 is arranged to store data on the memory storage 420, receive visual information from at least one visual information generating device 430, run the computer program product arranged to execute the steps according to any of the claims 1 to 15, and provide the representation of the visual information based on the sparsified coefficient sets 120. The system may be a personal computer. The system may comprise a sensor system. The system may be a sensor system. The processor 410 may be arranged to control at least one visual information generating device 430. At least one visual information generating device 430 may be at least one camera. At least one visual information device 430 may be a database comprising visual information. The system may comprise hardware for wireless communication between the processor 410 and the at least one visual information generating device 430.

The memory storage 420 is arranged to store a computer program product for performing at least parts of the disclosed method described in relation to FIG. 2 and FIG. 3. Said computer program product may at least partly be run on said processor 410. Said computer program product may comprise routines for controlling any of the at least one visual information generating device 430. Said computer program product may comprise routines for wireless communication between the processor and the at least one visual information generating device 430.

The invention claimed is:

1. A computer implemented method for representing a data set comprising at least one n dimensional data element (110) representing visual information, said method comprising the steps of:
    obtaining (210) said data set,
    obtaining (220) a dictionary ensemble (100) comprising a plurality of dictionaries (101) each comprising at least one basis function (102),
    assigning (230) each at least one data element (110) to a dictionary (101), wherein a set of basis functions (102) represents an m dimensional transformation domain,
    transforming (240) the at least one data element (110) with the corresponding dictionary (101) of basis functions (102) to the transformation domain wherein each data element (110) is defined by an associated coefficient set (120),
    sparsifying (250) the coefficient sets (120), and
    forming (260) the representation of the visual information comprising a coefficient data set (120) and the corresponding dictionaries (101),
    wherein:
        the obtained dictionary ensemble (100) comprises an ensemble of dictionaries formed from a combination of at least the at least one pre-cluster ensemble,
        each pre-cluster ensemble is obtained from a training data set of training visual information comprising training data elements,
        the training visual information is divided into pre-clusters,
        the pre-clusters are clustered by assigning each training data element (110) to a dictionary of basis functions (102) in a corresponding pre-cluster ensemble of dictionaries for each pre-cluster,
        each pre-cluster ensemble is trained to minimize the reconstruction error and maximize the sparseness of the training coefficient sets (120) of training data elements (110), and
        the clustering has been updated and the training iterated until at least one criteria is fulfilled.

2. The method according to according to claim 1, wherein the ensemble obtaining step (220) further comprises an ensemble learning step (300) comprising:
    obtaining (310) a training data set of training visual information comprising training data elements,
    dividing (320) the training visual information into pre-clusters,
    initializing (330) a pre-cluster ensemble of dictionaries for each pre-cluster, clustering (340) the pre-clusters by assigning each training data elements to a dictionary of basis functions in the corresponding pre-cluster ensemble, training (350) each pre-cluster ensemble to minimize the reconstruction error and maximize the sparseness of the training coefficient sets of training data elements, updating (360) the clustering and iterating the training until at least one criteria is fulfilled, and combining (370) at least the at least one pre-cluster ensembles to form an ensemble of dictionaries (100).

3. A method according to claim 2, wherein the pre-clustering is based on sparsity.

4. A method according to claim 2, wherein the at least one criteria is a reconstruction error below a value and/or a sparsity value above a certain value.

5. The method according to claim 2, wherein the learning step (300) is based on machine learning.

6. The method according to claim 1, wherein transformation domain dimensionality, m, is at least 2 and wherein the sets of basis functions (102) independently represent each data element (110) in its various dimensions in the transformation domain.

7. The method according to claim 1, wherein transformation domain dimensionality, m, is equal to or larger than the dimensionality of the visual information, n, and wherein the sets of basis functions (102) independently represent each data element (110) in its various dimensions in the transformation domain.

8. The method according to claim 1, further comprising a reconstruction step comprising:

selecting a data element (130) and selecting at least one dimension for reconstruction of data points (131) in said data element (130), and reconstructing at least one data point (131) in the selected at least one dimension from the corresponding set of coefficients (120) and dictionary (101) of basis functions.

9. The method according to claim 8, wherein the obtained data set comprises key frames and the reconstruction step is arranged to generate intermediate frames.

10. The method according to claim 1, wherein the obtained data set comprises sensor data elements (110) and/or data points (111) based on interpolation of sensor data.

11. The method according to claim 1, wherein the obtained data set comprises data elements (110) and/or data points (111) based on interpolation of computer-generated imagery.

12. The method according to claim 1, wherein the threshold for sparsifying coefficients is defined by the amount of tolerable error in the lossy compression.

13. The method according to claim 1, wherein forming (260) the representation of the visual information comprises compressing at least one sparsified coefficient set (120).

14. Use of a computer implemented method according to claim 1 for compressed sensing, wherein the visual information is obtained continuously from a sensor system.

15. A computer program for performing the method for representing a data set comprising n dimensional data elements (110) representing visual information according to claim 1.

16. A computer program product for performing the method for representing a data set comprising n dimensional data elements (110) representing visual information according to claim 1.

17. System (400) for representing a data set comprising n dimensional data elements (110) representing visual information, said system comprising:

a processor (410), a memory storage (420), and at least one visual information generating device (430), wherein the processor (410) is configured to:

store data on the memory storage (420), receive visual information from at least one visual information generating device (430), run a computer program arranged to execute the steps according to claim 1, and provide the representation of the visual information based on the sparsified coefficient sets (120).

18. The system according to claim 17, wherein at least one visual information generating device (430) is a sensor system capturing a physical scene.

19. The system according to claim 17, wherein at least one visual information generating device (430) is a database providing visual information.

20. The system according to claim 17, wherein at least one visual information generating device (430) is a computer providing computer generated imagery.

21. The system according to claim 17, wherein the processor (410) is arranged to control at least one of the at least one visual information generating device (430).

22. A computer-implemented method (300) for learning an ensemble (100) of dictionaries, comprising:

a step (310) of obtaining a training data set comprising training data elements representing n dimensional training visual information, a step (320) of dividing the training visual information into at least one pre-cluster, a step of creating a pre-cluster ensemble for each pre-cluster of training visual information, and a step (370) of combining at least the at least one pre-cluster ensemble to form an ensemble (100) of dictionaries, wherein the step of creating the at least one pre-cluster ensemble for each pre-cluster comprises initiating (330) a pre-cluster ensemble of dictionaries comprising basis functions for each pre-cluster, clustering (340) the at least one pre-cluster of training visual information by assigning each training data element to a dictionary of the corresponding pre-cluster ensemble, training (350) each pre-cluster ensemble to minimize the reconstruction error and maximize the sparseness of the training coefficient sets of training data elements, and updating (360) the clustering and iterating the training of the pre-cluster ensemble until at least one criteria is reached.

23. A method according to claim 22, wherein the dividing of the training visual information into at least one pre-cluster is based on sparsity.

24. A method according to claim 22, wherein the at least one criteria is a reconstruction error below a value and/or a sparsity value above a certain value.

25. The method according to claim 22, wherein the step of creating the at least one pre-cluster ensemble is based on machine learning.

* * * * *

UNITED STATES PATENT AND TRADEMARK OFFICE
CERTIFICATE OF CORRECTION

PATENT NO. : 12,174,922 B2
APPLICATION NO. : 17/413321
DATED : December 24, 2024
INVENTOR(S) : Ehsan Miandji et al.

Page 1 of 1

It is certified that error appears in the above-identified patent and that said Letters Patent is hereby corrected as shown below:

In the Claims

In Column 8, Line 59, Claim 2, delete "to according to" and insert -- to --, therefor.

Signed and Sealed this
Sixth Day of May, 2025

Coke Morgan Stewart
*Acting Director of the United States Patent and Trademark Office*